US009952316B2

(12) United States Patent  
Van Toorenburg et al.

(10) Patent No.: US 9,952,316 B2
(45) Date of Patent: Apr. 24, 2018

(54) MOBILE MEASUREMENT DEVICES, INSTRUMENTS AND METHODS

(71) Applicant: IKEGPS Group Limited, Wellington (NZ)

(72) Inventors: Leon Mathieu Lammers Van Toorenburg, Wellington (NZ); Donald Stewart Mawson, Wellington (NZ); Allan David Beach, Prebbleton (NZ)

(73) Assignee: IKEGPS Group Limited, Newtown, Wellington (NZ)

( * ) Notice: Subject to any disclaimer, the term of this patent is extended or adjusted under 35 U.S.C. 154(b) by 176 days.

(21) Appl. No.: 14/593,421

(22) Filed: Jan. 9, 2015

(65) Prior Publication Data

US 2015/0116694 A1   Apr. 30, 2015

Related U.S. Application Data

(63) Continuation-in-part of application No. 13/993,952, filed as application No. PCT/NZ2011/000257 on Dec. 9, 2011, now abandoned.

(60) Provisional application No. 61/422,542, filed on Dec. 13, 2010.

(51) Int. Cl.
```
H04N 7/18      (2006.01)
G01S 7/481     (2006.01)
G01S 17/08     (2006.01)
G01S 17/02     (2006.01)
```
(52) U.S. Cl.
CPC .......... *G01S 7/4813* (2013.01); *G01S 17/023* (2013.01); *G01S 17/08* (2013.01)

(58) Field of Classification Search
CPC ....................................................... G01S 48/13
See application file for complete search history.

(56) References Cited

U.S. PATENT DOCUMENTS

| 5,179,286 A | 1/1993 | Akasu |
| 5,767,953 A | 1/1998 | McEwan |
| 6,642,955 B1 | 11/2003 | Midgley et al. |
| 7,616,316 B1 | 11/2009 | Silver et al. |

(Continued)

FOREIGN PATENT DOCUMENTS

| CN | 101271678 | 9/2008 |
| CN | 201131029 | 10/2008 |

(Continued)

OTHER PUBLICATIONS

International Search Report for International Application No. PCT/NZ2011/000257 dated May 10, 2012 (4 pages).

(Continued)

*Primary Examiner* — Tracy Y Li
(74) *Attorney, Agent, or Firm* — Merchant & Gould P.C.

(57) ABSTRACT

A portable instrument or apparatus includes a portable device and a rangefinder module. The rangefinder module can be attached to the portable device, which may be any suitable smartphone, tablet or other consumer electronics device having a camera. By suitable alignment of the rangefinder and camera, the device is capable of capturing accurate data over significant ranges, including for example an image of a target together with position information concerning the target. A folded optical arrangement reduces the volume and thickness of the rangefinder module.

28 Claims, 8 Drawing Sheets

(56) References Cited

U.S. PATENT DOCUMENTS

| | | | |
|---|---|---|---|
| 7,647,197 | B2 | 1/2010 | Prentice et al. |
| 8,384,780 | B1 | 2/2013 | Frank et al. |
| 8,416,468 | B2 | 4/2013 | Underwood et al. |
| 2006/0125924 | A1 | 6/2006 | Chang et al. |
| 2006/0197867 | A1 | 9/2006 | Johnson et al. |
| 2006/0289772 | A1 | 12/2006 | Johnson et al. |
| 2007/0030348 | A1 | 2/2007 | Snyder |
| 2007/0091178 | A1 | 4/2007 | Cotter et al. |
| 2007/0287132 | A1 | 12/2007 | LaMons et al. |
| 2008/0075445 | A1 | 3/2008 | Whillock |
| 2008/0266541 | A1 | 10/2008 | Yung et al. |
| 2010/0014784 | A1 | 1/2010 | Underwood et al. |
| 2010/0023185 | A1 | 1/2010 | Terwelp et al. |
| 2010/0030515 | A1* | 2/2010 | Kludas ............... G01C 15/002 702/159 |
| 2010/0085556 | A1* | 4/2010 | Bedwell ............ G01C 15/002 356/4.02 |
| 2010/0253489 | A1 | 10/2010 | Cui et al. |
| 2011/0199482 | A1 | 8/2011 | Morgan |
| 2011/0279808 | A1* | 11/2011 | Dunne ................ G01S 7/4813 356/4.01 |
| 2011/0294543 | A1 | 12/2011 | Lapstun et al. |
| 2013/0294467 | A1* | 11/2013 | Moloney ................ H01S 3/10 372/20 |
| 2013/0335559 | A1 | 12/2013 | Van Toorenburg |

FOREIGN PATENT DOCUMENTS

| | | |
|---|---|---|
| CN | 201173766 | 12/2008 |
| CN | 201488701 | 5/2010 |
| DE | 10051743 A1 | 5/2002 |
| EP | 0 874 218 | 10/1998 |
| EP | 2163846 A1 | 3/2010 |
| GB | 2425602 | 11/2006 |
| WO | 9312604 A1 | 6/1993 |
| WO | 03062849 A1 | 7/2003 |
| WO | WO 2004/036246 A1 | 4/2004 |

OTHER PUBLICATIONS

European Search Report for EP Application No. 11 84 8295 dated May 22, 2014 (5 pages).

Written Opinion for International Application No. PCT/NZ2011/000257 dated Jun. 18, 2013 (5 pages).

Gilstrap et al. "Integrated Sight Boresighting", Mar. 1, 1998, 11 pages.

Osgood et al. "Minimisation of Alignment Error Between a Camera and a Laster Range Finder Using Neider-Mead Simplex Direct Search", Jun. 21-24, 2010, 1 pages, http://ieeexplore.ieee.org/Xplore/login.jsp?url=http:ieeexplore.ie, IEEE Explore.

Thomas et al. "Heterogeneous Distributed Database Systems for Production Use", Sep. 1, 1990, 237-266 pages, vol. 22, No. 3., ACM Computing Surveys.

\* cited by examiner

MOBILE MEASUREMENT DEVICES, INSTRUMENTS AND METHODS

This application is a Continuation-in-Part of U.S. Ser. No. 13/993,952, filed 26 Aug. 2013, which is a National Stage Application of PCT/NZ2011/000257, filed 9 Dec. 2011, which claims benefit of U.S. Provisional Ser. No. 61/442,542, filed 13 Dec. 2010 and which applications are incorporated herein by reference. To the extent appropriate, a claim of priority is made to each of the above disclosed applications.

FIELD OF THE INVENTION

The invention relates to mobile devices for capturing images and measuring positions.

BACKGROUND TO THE INVENTION

Devices that capture data from various combinations of sensors are used in many applications. Such devices including sensors that require alignment or calibration are generally aligned or calibrated in the factory. The devices are generally suitable for performing a specific dedicated task but not suitable for other purposes. This leads to high cost and for some applications the cost cannot be justified.

It is an object of the invention to provide a device for augmenting the sensors provided in standard consumer electronics devices within a compact housing, the resulting instrument being capable of capturing images and precise positional data.

It is a further object of the invention to provide a device that enables user alignment of a camera and laser rangefinder.

It is a further object of the invention to provide a device that enables user alignment of a camera, laser rangefinder and one or more orientation sensors.

Each object is to be read disjunctively with the object of at least providing the public with a useful choice.

Exemplary Embodiments

According to one exemplary embodiment there is provided a data capture method including: mounting a rangefinder module to a portable device, the rangefinder module including a laser rangefinder emitting and detecting a rangefinder beam and the portable device including a camera and a display, such that, in a mounted state, the laser rangefinder and camera are in fixed relation to each other. A direction of the laser rangefinder is determined by: capturing one or more alignment images using the camera; determining from the image or images a position of the rangefinder beam in the image or images; and determining from the position a laser rangefinder direction relative to the camera. Data is captured by: displaying an image from the camera on the display with a marker, the marker and the determined laser rangefinder direction being aligned such that the apparatus is arranged to be pointed by a user towards a target by aligning the marker with the target; and capturing substantially simultaneously an image including the target using the camera and a range to the target using the laser rangefinder.

An alignment range may be captured using the laser rangefinder, substantially simultaneously with the one or more alignment images, the laser range finder direction being determined from the position and alignment range.

The rangefinder beam may be an infrared laser beam and the camera may be sensitive to visible and infrared light.

Detection of the rangefinder beam may be enhanced by reducing the amount of visible light entering the camera.

The step of reducing the amount of visible light entering the camera may include temporarily positioning an infrared pass visible blocking filter in front of the camera.

Alternatively, a visible laser beam with a known relationship to the rangefinder beam may be projected, the step of determining from the image or images a position of the rangefinder beam in the image or images including determining the position of the visible laser beam and determining the position of the rangefinder beam based on the position of the visible laser beam and the known relationship.

Alternatively, the step of determining from the image or images a position of the rangefinder beam in the image or images may include subtracting a visible background to enhance detection of the infrared laser rangefinder beam. The background may be determined from a first image captured by the camera in the absence of the laser rangefinder beam.

Multiple pulses of the laser rangefinder beam may be detected per frame captured by the camera to enhance detection of the infrared laser rangefinder beam.

Alternatively, data may be accumulated over multiple camera frames to enhance detection of the infrared laser rangefinder beam.

Alternatively, a target may be provided, at least partly formed form a material that converts infrared light to visible light, at least one of the alignment images being captured with the laser rangefinder aligned with the target, and determining from the image or images a position of the rangefinder beam in the image or images includes detecting the visible light emitted by the target material.

The step of capturing substantially simultaneously one or more alignment images using the camera and an alignment range using the laser rangefinder may be performed in a darkened space.

The step of capturing substantially simultaneously one or more alignment images using the camera and an alignment range using the laser rangefinder may be performed two or more times at different ranges.

The marker and the determined laser rangefinder direction may be aligned by either: displaying a marker in alignment with the determined laser rangefinder direction whether or not that direction is offset from a display centre; or displaying a marker at the display centre and aligning a displayed image to bring the laser rangefinder direction to the display centre.

The rangefinder module or the portable device may include a positioning system and one or more orientation sensors, the step of capturing data including capturing a position of the rangefinder module or portable device using the positioning system and an orientation of the rangefinder module or portable device using the orientation sensors substantially simultaneously with capture of the image and range.

Before capturing data, the one or more orientation sensors may be aligned with the laser rangefinder direction.

This alignment may be performed by: capturing a first set of orientation parameters with the portable apparatus in a first position and a first orientation while aiming the portable apparatus at a second position; capturing a second set of orientation parameters with the portable apparatus in the first position and a second orientation while aiming the portable apparatus at the second position; capturing a third set of orientation parameters with the portable apparatus in the second position and the first orientation while aiming the portable apparatus at the first position; capturing a fourth set of orientation parameters with the portable apparatus in the second position and the second orientation while aiming the portable apparatus at the first position; and from the differences between the four sets of orientation parameters, determining one or more offsets for the one or more orientation sensors.

Captured data may be communicated from the rangefinder module to the portable device.

According to another exemplary embodiment there is provided, in a measurement apparatus including: a portable device including: a camera; a display; a processor; and memory; and a rangefinder module including: a laser rangefinder emitting a rangefinder beam; and a mounting arrangement for mounting the rangefinder module to the portable device such that, in a mounted state, the laser rangefinder and camera are in fixed relation to each other; the apparatus being configured to implement a wired or wireless communications link between the portable device and the rangefinder module; a method including: determining a direction of the laser rangefinder by: capturing one or more alignment images using the camera; determining from the image or images a position of the rangefinder beam in the image or images; and determining from the position a laser rangefinder direction relative to the camera; and capturing data by: displaying an image from the camera on the display with a marker, the marker and the determined laser rangefinder direction being aligned such that the apparatus is arranged to be pointed by a user towards a target by aligning the marker with the target; and capturing substantially simultaneously an image including the target using the camera and a range to the target using the laser rangefinder.

According to another exemplary embodiment there is provided a computer readable medium having encoded thereon computer readable instructions that when executed on a portable device including a processor, a camera and a display, with an attached laser rangefinder module, are arranged to: cause, in response to detection of an alignment capture instruction: capture of one or more alignment images using the camera; the processor to determine from the image or images a position of the rangefinder beam in the image or images; and the processor to determine from the position a laser rangefinder direction relative to the camera; and cause a marker and the determined laser rangefinder direction to be aligned such that the apparatus is arranged to be pointed by a user towards a target by aligning the marker with the target; and cause, in response to a data capture instruction: substantially simultaneous capture of an image including the target using the camera and a range to the target using the laser rangefinder.

According to another exemplary embodiment there is provided a method of aligning a camera and one or more orientation sensors in a portable apparatus, including: capturing a first set of orientation parameters with the portable apparatus in a first position and a first orientation while aiming the portable apparatus at a second position; capturing a second set of orientation parameters with the portable apparatus in the first position and a second orientation while aiming the portable apparatus at the second position; capturing a third set of orientation parameters with the portable apparatus in the second position and the first orientation while aiming the portable apparatus at the first position; capturing a fourth set of orientation parameters with the portable apparatus in the second position and the second orientation while aiming the portable apparatus at the first position; from the differences between the four sets of orientation parameters, determining one or more offsets for the one or more orientation sensors.

Preferably the one or more offsets are stored in memory.

Preferably a marker is displayed on a display of the portable apparatus, the marker being overlaid on an image from the camera, wherein aiming the portable apparatus involves aligning the marker with the first or second position.

According to a further exemplary embodiment there is provided a laser range finder module configured for attachment to a portable device including a camera having an optical axis, the module including: a laser range finder substantially aligned on a rangefinder axis; and one or more optical elements positioned to redirect light so as to substantially align the rangefinder axis and a camera optical axis when the laser range finder module is mounted on a portable device.

Preferably the laser rangefinder module includes a mounting arrangement configured to mount the laser rangefinder module to a portable device.

Preferably a folded optical path is employed to reduce the thickness of the laser rangefinder and the volume occupied by optical components. A first folded optical path from the range finder axis to the laser receiver may be formed by optical elements including two or more mirrors, with a first preferably inclined at an angle of between 50 to 60 degrees to the rangefinder axis. A second mirror is preferably provided substantially parallel to the first mirror. The first folded optical path preferably directs received light onto a surface mounted laser receiver.

The orientation of the first and/or second mirrors may be adjustable with respect to the rangefinder module to achieve focus and/or alignment.

A Fresnel lens is preferably provided in the optical path prior to the first mirror.

The grooves of the Fresnel lens may face away from the first mirror, in which case it is desirable to provide a cover window over the Fresnel lens, or the grooves may face towards the first mirror, which is a simpler implementation although optically inferior. When a cover window is employed the Fresnel lens preferably includes a nipple to keep the cover window spaced apart from the Fresnel lens to avoid the incidence of Newton's rings.

Optical coatings are preferably provided on interior surfaces of the Fresnel lens and/or cover window. The optical coatings preferably have a pass band of about 905 nm.

The transmit path may include a similarly arranged second folded optical path from the laser emitter to the range finder axis, although in this case no lens is required. The second folded optical path may be formed by two or more mirrors inclined at an angle of between 50 to 60 degrees to the rangefinder axis. One or more mirrors may be adjustable with respect to the rangefinder module to adjust focus and or alignment.

Preferably the laser rangefinder is positioned within the laser rangefinder module such that the laser beam, before being redirected, is emitted in a plane that is substantially parallel to a plane of a generally flat-bodied portable device, when the module is mounted on that portable device.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain, by way of example only, the principles of the invention.

DETAILED DESCRIPTION

Figure 1:
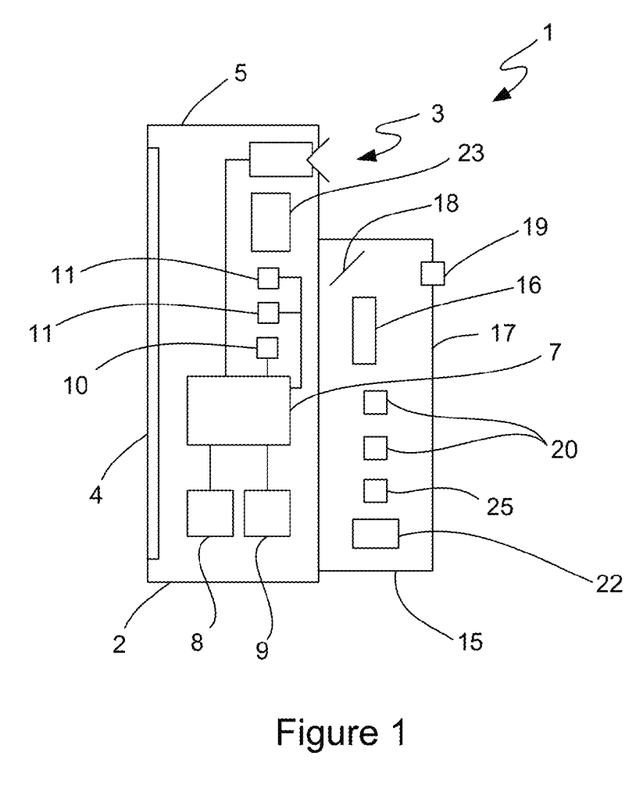
FIG. 1 is a schematic diagram of an instrument or apparatus according to one embodiment.

FIG. 1 shows an instrument 1 according to one embodiment. The instrument 1 includes a portable device 2, which may be a smartphone, tablet or similar device. The portable device 2 may also be a portable GPS device. Such devices are available from suppliers such as Trimble, and may include a camera, display and GPS receiver.

The portable device is preferably a readily available item. The portable device 2 may include a camera 3 and a display 4 mounted in a housing 5. The portable device may also include a processor 7 and memory 8, and preferably includes one or more local communications modules 9, such as Bluetooth or USB communications modules. The portable device 2 may include other sensors, such as a positioning (e.g. GPS) module 10 and one or more orientation sensors 11. The orientation sensors 11 may include any suitable combination of direction-finding devices (e.g. magnetic or GPS compasses), tilt sensors and gyroscopes. The portable device preferably also includes a suitable user input arrangement, which may be a button, keypad, touchscreen, voice recognition, mouse or any other suitable input arrangement.

The instrument 1 also includes a rangefinder module 15. The rangefinder module 15 includes a laser rangefinder 16 mounted in a housing 17. In order to achieve a compact form, the rangefinder is oriented along the housing with one or more mirrors or similar reflectors 18 redirecting the rangefinder, such that laser light is emitted and received through window 19. In general the rangefinder will be aligned along a rangefinder axis that extends from the rangefinder to a target. The reflectors 18 substantially align the rangefinder axis with the camera optical axis, with further alignment achieved as discussed below.

This arrangement provides a thin or low profile rangefinder module that substantially retains the form factor of the portable device, such that the instrument 1 can be held in the same way. In one embodiment the rangefinder module 15 is less than 30 mm, preferably less than 20 mm in thickness.

In the embodiment shown the laser light is redirected through 90 degrees. However, in some embodiments a smaller or larger redirection may be required. For example, some handheld GPS units have their display and the larger part of their body oriented at about 20 to 30 degrees to the camera optical axis. If the Applicant's laser rangefinder module is arranged with its housing substantially parallel to the GPS unit display, then the optical axis need be redirected only by 20 to 30 degrees.

Although a mirror or other reflector 18 is shown in the drawings, any other suitable optical element may be used to redirect the laser rangefinder path. For example, where only a small redirection is required a prism may be used. Where reflectors are used these may be mirrors or right angle prisms or any other suitable reflector.

The laser rangefinder will generally include a laser configured to emit an infrared laser beam (usually around 905 nm, although any suitable wavelength may be used) and a camera to detect the reflected laser beam. The time of flight of a laser pulse, or the phase of a modulated signal on the laser, is detected and used to determine a range.

The rangefinder module 15 may include other sensors 20, which may include positioning and orientation sensors. The rangefinder module preferably has a battery 22 to reduce the load on the portable device battery 23, as the rangefinder and other sensors in the rangefinder module will consume substantial energy. The rangefinder module may have a suitable port for connection of a battery charger, or the rangefinder module may draw power from a connection to the portable device.

The rangefinder module also includes a communications module 25 (such as a Bluetooth or USB module) for communicating over a communications link with the communications module 9 of the portable device 2.

In general the rangefinder module 15 may provide any desired set of sensors to augment the sensors provided by the portable device 2. Even if the portable device includes a particular sensor, a further or more accurate sensor of the same kind may be provided in the rangefinder module.

Figure 2:
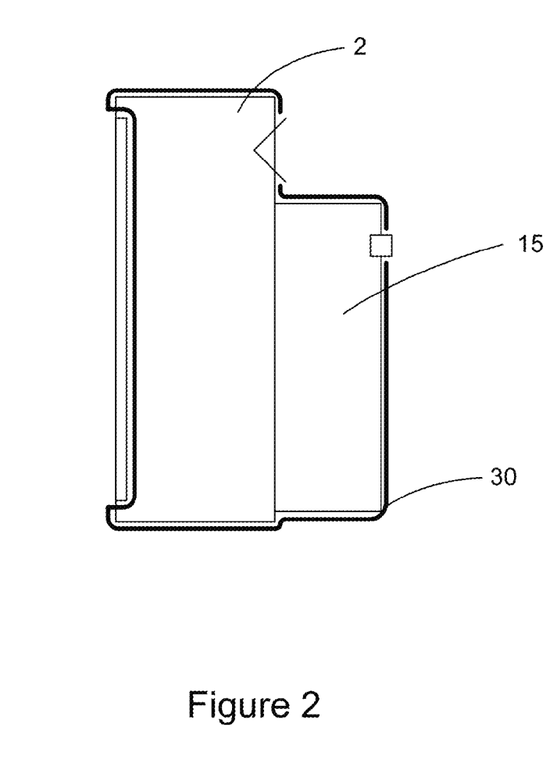
FIG. 2 is a further schematic view of the instrument or apparatus of FIG. 1.

As shown in FIG. 2, the rangefinder module 15 may be mounted to the portable device 2 using a suitable case 30, for example a clamshell-type or elastic case. Preferably the case mounts the rangefinder module to the portable device with sufficient rigidity to prevent unwanted movement between the two. Any suitable joining mechanism that achieves this purpose may be used in place of the case. The case may be specific to the type of portable device used. The part of the case that fits to the rangefinder module may be standard with different interfaces for different portable devices.

Thus the rangefinder module 15 can be mounted in fixed relation to the portable device 2. However, this does not provide an accurate alignment of the laser rangefinder 16 and the camera 3. The rangefinder module may be manufactured to provide approximate alignment to the camera 3 of a particular type of portable device. However, manufacturing tolerances and variations in the devices and mounting arrangements will result in variations in alignment.

Figure 3:
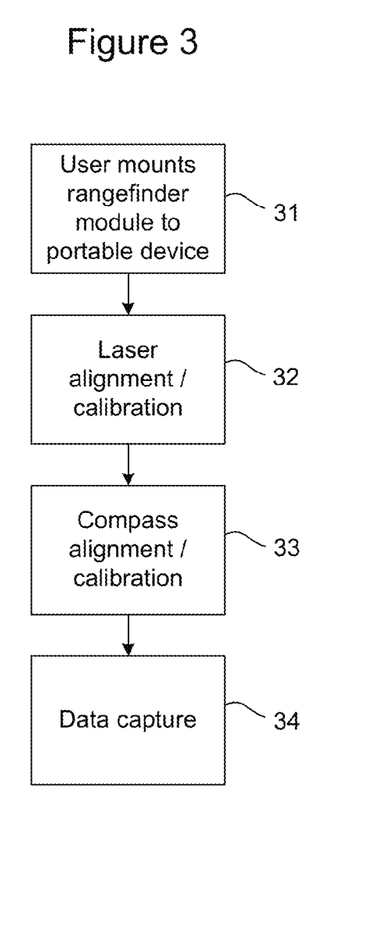
FIG. 3 is a flow chart illustrating a method according to one embodiment.

FIG. 3 is a flow diagram showing how the Applicant's instrument 1 is configured for user alignment and calibration. At step 31 a user mounts the rangefinder module 15 to the portable device 2. At step 32, a laser alignment process is implemented, as shown in more detail in FIG. 4. At step 41 the instrument captures one or more alignment images using the camera 3. For the most accurate alignment the instrument may be directed at a relatively flat surface during this step. In at least some of these images the laser rangefinder is on, with the laser beam preferably emitting multiple pulses per image. The position of the laser rangefinder in the alignment images may then be determined at step 42.

The cameras in most Smartphones and other consumer electronics devices have sensors that are sensitive over the visible spectrum and into the infrared. However, in order to improve their performance in the visible range, an infrared blocking filter is usually added during manufacture. The camera generally remains slightly sensitive in the infrared, so the resulting alignment images will be formed by visible light and infrared light (including the laser rangefinder beam). As the sensitivity in the infrared is low due to the infrared blocking filter, it may be desirable to enhance detection of the infrared light. This can be achieved in several different ways.

If one colour channel of the sensor is more sensitive in the infrared than other channels, it alone may be used for detection of the infrared laser beam.

The level of visible light reaching the sensor may be reduced, which will result in the infrared forming a greater proportion of detected light. For example, the user could capture the alignment images in a darkened space, such as a room with the lights off. Alternatively, a visible blocking infrared pass filter could be used. A suitable filter could be stored in the device housing and could be a "pop-up" retractable filter.

Alternatively, a frequency conversion material may be used. Laser detection phosphors, or other suitable materials, absorb infrared light and emit visible light. If the laser rangefinder is directed at such a material, the visible light emitted by that material can be detected and used to determine the infrared beam position. A suitable material may be provided as part of the device packaging, or may be provided on a small card stored in the device housing.

Alternatively, multiple (possible a hundred or more) frames may be captured, with the small infrared signal being accumulated over those multiple frames and the infrared signal improved by way of video averaging. Overlaying and adding video frames causes the random noise components to cancel, while a constant signal (the IR light) will tend to be additive, hence pulling the signal out of the noise. The optimum number of frames to average over will depend on the brightness contrast of the laser spot with the background light. An optical system with a high level of IR cut filtering will need more averaging.

As yet another alternative a background frame may be captured with no laser beam (i.e. with the rangefinder off) and this background data can be subtracted from an alignment image with the laser beam on. In this way much of the visible light data will be eliminated.

Yet a further alternative involves the use of a visible light laser. A visible alignment laser is provided in the rangefinder module aligned with, or with a known alignment to, the rangefinder laser. The alignment images are captured using this alignment laser and the position of the rangefinder laser can be determined from the position of the alignment laser in the alignment images.

Figure 4:
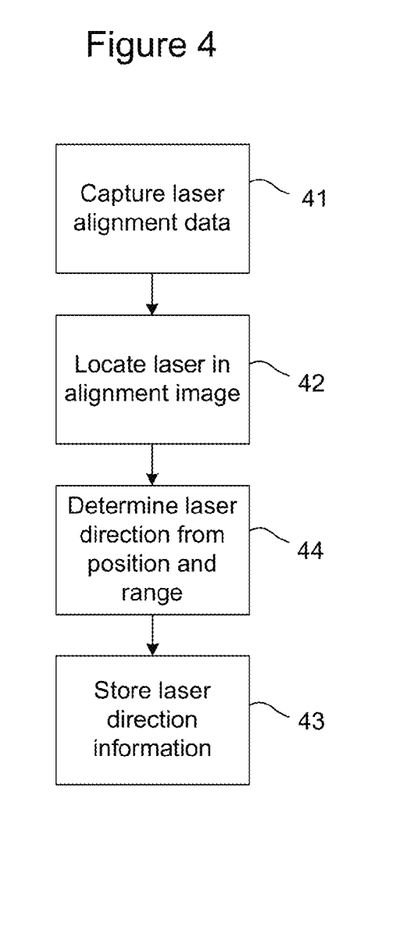
FIG. 4 is a flow chart showing in further detail the laser alignment step of FIG. 3.

In any case, one or more alignment images may be captured using the camera 3, and from those image(s) the position of the laser rangefinder beam in the image(s) can be determined, optionally using one of the enhancement techniques described above.

Substantially simultaneously with capture of the alignment image(s), an alignment range is captured using the laser rangefinder. This may be done within a short time period of the alignment image(s) being captured. However, if the time period is too long there may be some appreciable movement of the device, which will reduce the accuracy of the alignment process. Preferably the alignment image(s) and alignment range are captured over a period of time less than 0.5 second, preferably less than 0.1 seconds. However, in other embodiments the device may be mounted on a rigid support, eliminating the possibility of movement and allowing longer time periods to be used.

From the position of the laser rangefinder beam in the alignment image(s) and the known distance to whatever object the laser rangefinder is aimed at, a direction or offset of the rangefinder beam relative to the camera 3 can be determined at step 43.

This is determined from a simple relationship between the position of the beam on the sensor and the range. A pixel on the sensor corresponds to a line extending from that pixel through the optical centre (or rather to a solid angle since the pixel has some area). The range allows a point on that line to be identified. The laser rangefinder direction extends from the rangefinder laser through that point.

A less accurate determination of rangefinder direction can be determined based on the position of the beam on the sensor without the range information. If it is assumed that the rangefinder and camera are at the same point then the position of the beam on the sensor relates to a line, which is the rangefinder direction. However, the loss of accuracy from that assumption makes this method less desirable.

The distance between the camera optical axis and the laser rangefinder may also be taken into account. This distance is known as a parameter of the mounting arrangement and the physical configuration of the portable device and rangefinder module. This information can be used to ensure that the marker displayed on the display 4 (as discussed below) corresponds to the laser rangefinder direction (i.e. is parallel to the laser rangefinder direction).

Alignment images may be captured at a single distance from the alignment target, or two or more sets of images may be captured at different distances from the target to improve the alignment accuracy. Where two or more images are captured at different distances, the distance between the camera optical axis and rangefinder need not be known. The distance between the camera optical axis and rangefinder can be determined from the two sets of alignment images if needed.

In addition, further improvements in accuracy may be achieved as follows. Many portable devices include auto-focussing cameras. As the focussing distance of the camera changes, the field of view of the camera also changes. This means that the solid angle defined by each pixel changes with focussing distance. This effect may lead to inaccuracies in the alignment process. In one embodiment, the camera may therefore be forced to a known focus point such that the alignment procedure can be carried out based on known pixel parameters. For example, the camera may be forced to the hyperfocal distance, or to focus at infinity. In either case, the pixel solid angle will be known and can be used in accurate alignment by the processes described above. The camera can be forced to focus as required using a software step appropriate to the particular portable device 2.

At step 44 the laser rangefinder direction information is stored in memory in either or both of the portable device 2 and rangefinder module 15. The information can be used to adjust the display as follows.

Figure 7:
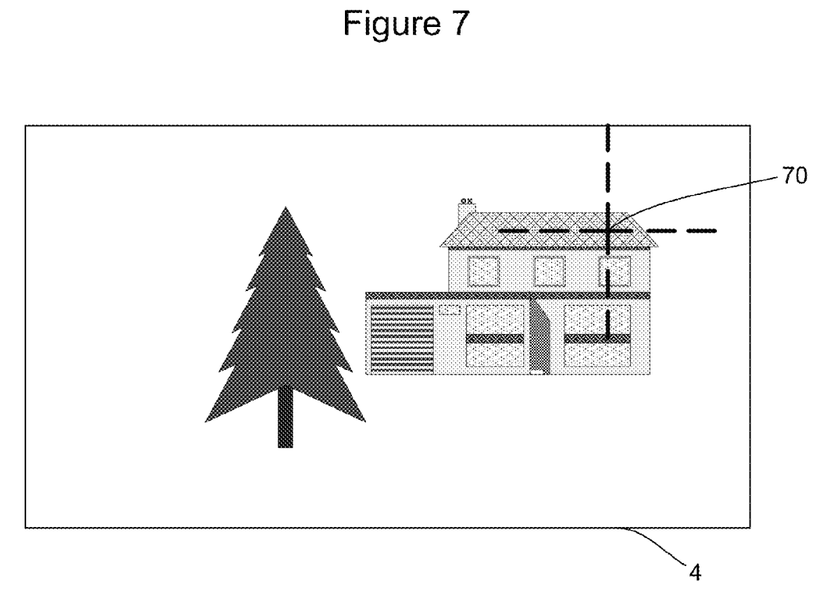
FIG. 7 shows a display of the instrument or apparatus in one embodiment.

FIG. 7 shows the display 4 displaying an image from the camera 3 to a user. The display 4 includes an overlaid marker 70, which is displayed to align with the laser rangefinder direction determined above. The marker can be a cross-hair or any other suitable marker. Thus, the user can use the marker to align the laser rangefinder with a target. When the user provides a capture command, the instrument will capture an image using the camera 3 and a range to the target using the laser rangefinder 16.

Figure 8:
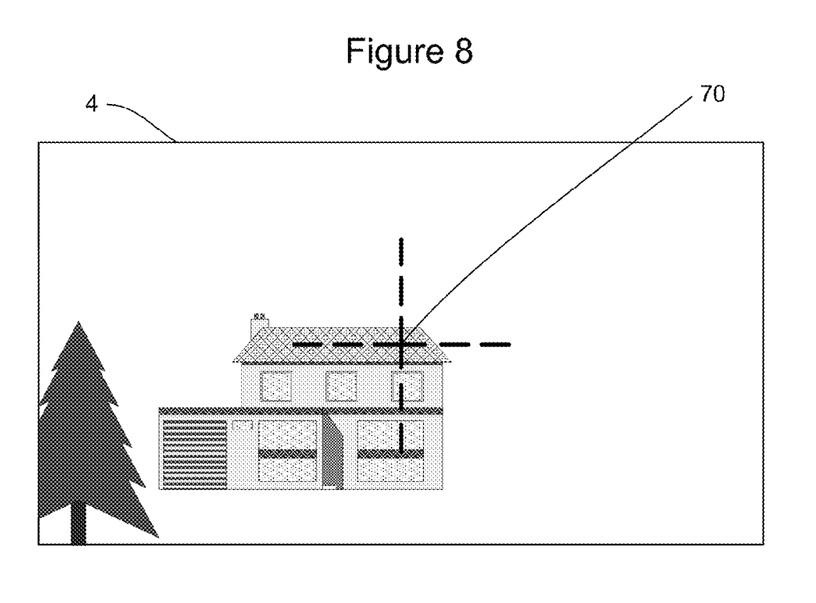
FIG. 8 shows the display of the instrument or apparatus in another embodiment.
Figure 9:
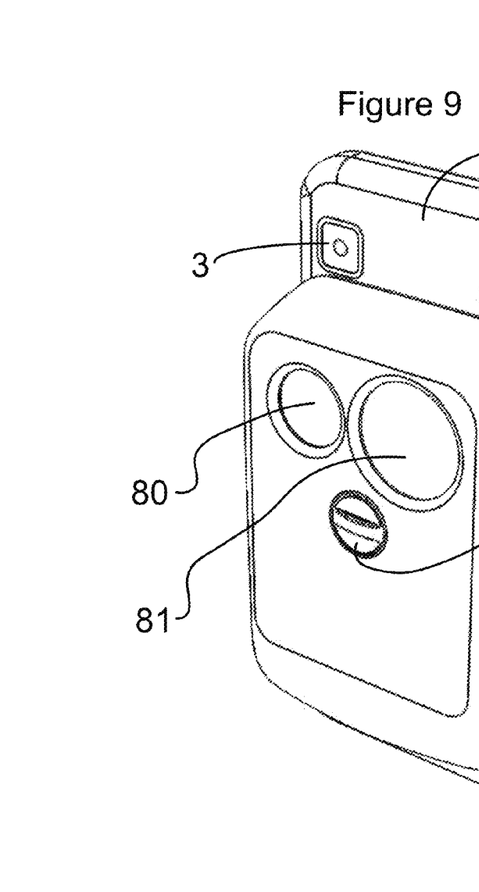
FIG. 9 shows an instrument or apparatus according to a further embodiment.

FIG. 8 shows an alternative arrangement, in which the marker 70 is overlaid at the centre of the display 4. The image has been moved such that the laser rangefinder direction is aligned with the marker 70. This requires a sample from the camera field of view to be displayed so the image can be shifted.

Thus, the Applicant's invention allows intuitive and accurate aiming of the laser range finder, using the camera and display of the portable device 2.

Returning to FIG. 3, a compass calibration or alignment process may be implemented at step 33. This process is shown in detail in FIG. 5. The goal is to align the compass, or any combination of orientation sensors, with the laser rangefinder direction. The orientation sensors may be provided in the portable device 2, or may be in the rangefinder module 15. In either case, the presence or operation of the other device or module may create magnetic fields that will create inaccuracy in the operation of the orientation sensors. In order to limit this effect, the orientation sensors are preferably operated while other sensors (e.g. the rangefinder, camera etc) are dormant and in the absence of high current events such as battery charging or operation of the camera flash. Substantially simultaneous data capture from all sensors can still be achieved by a suitable switching arrangement, such as described in the Applicant's U.S. Pat. No. 7,647,197, the entire contents of which are incorporated by reference herein.

Figure 5:
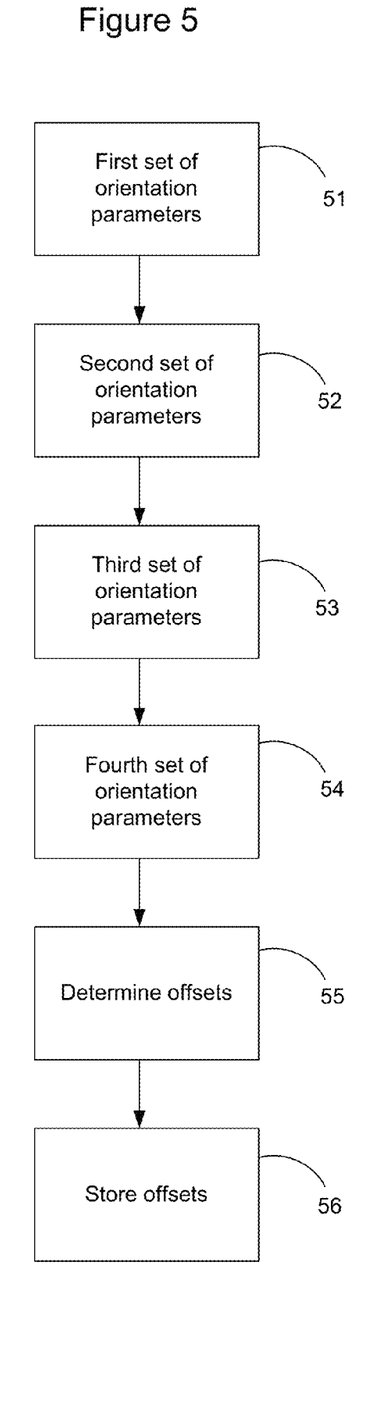
FIG. 5 is a flow chart showing in further detail the orientation sensor calibration step of FIG. 3.

In addition, a calibration routine may be performed as follows. At step 51 the user positions the portable instrument, including the portable device and the rangefinder module, in a first position and with a first (e.g. vertical) orientation. The first position may be defined by the top of a fixed wooden post or any other available preferably non-magnetic structure. For accurate calibration these measurement should be done in a constant magnetic field, for example in an open space such as a park or field, rather than in a building, or near metal materials. Using the display and marker 70, the user aims the instrument at a second position, which may be defined by some other such structure a suitable distance away (e.g. around 10 to 20 yards). The first and second positions should preferably be around the same height. The user provides a "capture" instruction, for example by pressing a button on the instrument. This causes a first set of orientation parameters to be captured, including a compass reading and pitch.

At step 52 the user positions the portable instrument in the first position but with a second (e.g. horizontal) orientation. The user again aims the instrument at a second position and provides a "capture" instruction, causing a second set of orientation parameters to be captured, including a compass reading and pitch.

At step 53 the user positions the portable instrument in the second position and with the first orientation. The user aims the instrument at the first position and provides a "capture" instruction, causing a third set of orientation parameters to be captured, including a compass reading, pitch and roll.

At step 54 the user positions the portable instrument in the second position and with the second orientation. The user aims the instrument at the first position and provides a "capture" instruction, causing a fourth set of orientation parameters to be captured, including a compass reading, pitch and roll.

These four sets of orientation parameters provide information on the orientation sensors, including compass and tilt sensors. By examining the differences in sensor readings between the four sets of parameters, it is possible to determine offsets for each orientation sensor at step 55. The difference in the bearings, less 180 degrees is the angular offset between the rangefinder direction and compass reading. In the absence of other errors, this should be the same for horizontal and vertical orientations. The pitch for each reading should be zero (level), so any offset in pitch can be used to offset the inclinometers.

Some smartphones change their sense orientation depending on whether they are held in the vertical or horizontal and this will need to be taken into account in the calibration routine.

Other compass calibration routines may occur to the skilled reader. Any suitable compass calibration routine may be used.

At step 56 the offsets are stored in memory, in either the portable device 2 or rangefinder module 15.

The orientation sensors, rangefinder and marker are now all aligned.

In order to improve the compass performance, gyroscopes and/or accelerometers can be monitored and their data used to cross-check against movements in the orientation sensor outputs. Also, as position information is also being gathered, the orientation data can be cross-checked against a model of the Earth's magnetic field. In any case, if there is an unexpected deviation in the data from the orientations sensors, a user warning can be displayed and/or an error indication can be saved within any data gathered.

The instrument is now ready to capture accurate data. The data capture process is step 34 of FIG. 3 and is shown in more detail in FIG. 6. At step 61 the instrument displays an image from the camera 3 on the display 4, with the marker 70 overlaid as discussed above. At step 62 the user aims the instrument such that the marker 70 is aligned with a target and at step 63 the user issues a capture instruction. This causes, at step 64, data to be captured from the sensors. Any data captured in the rangefinder module may be communicated over the communications link to the portable device. This data may include: an image from the camera 3, a position from the positioning system 10, a range from the rangefinder 16, and orientation from the orientation sensors 11. The position, range and orientation data allows the position of the target to be accurately determined. The position of the instrument is known, as is the range and direction to the target, so the target position can be calculated. At step 65, the data is stored, preferably associated as a single set of associated data, including any desired metadata, as discussed in the Applicant's U.S. Pat. No. 7,647, 197.

Figure 6:
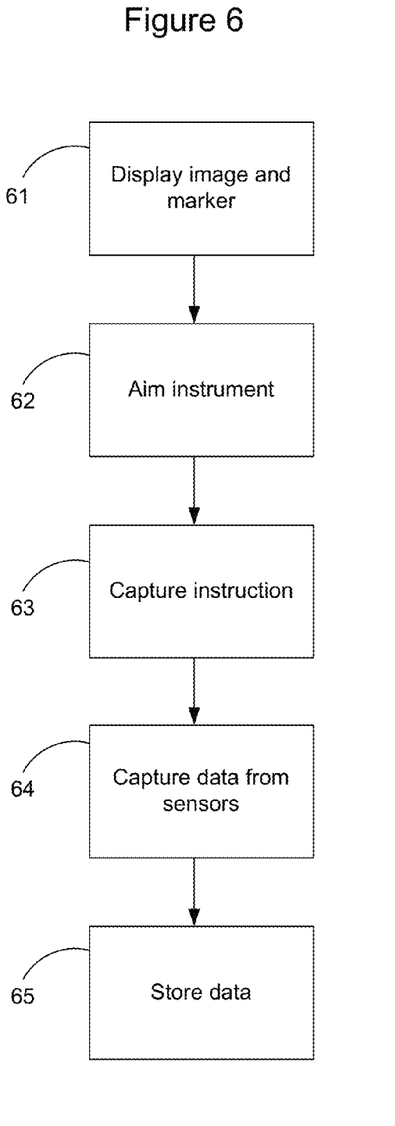
FIG. 6 is a flow chart showing in further detail the data capture step of FIG. 3.

The Instrument is preferably arranged to guide the user through the steps of FIGS. 4, 5 and 6. Suitable instructions may be displayed on the display 4 of the portable device 2. For example, at step 41 of the laser alignment process, the display may display user instructions: "Laser alignment: Aim at target and press capture button." Similar instructions may be displayed at other stages of the alignment, calibration and data capture procedures.

FIGS. 9 to 13 show another embodiment. The instrument or apparatus 1 includes a portable device 2 and a rangefinder module 15. In this case, the portable device 2 is a Smartphone with a camera 3. The rangefinder module 15 has two windows 80, 81. The rangefinder beam is emitted through the first window 80 and the laser signal reflected or scattered from the target is received through the second window 81.

Figure 10:
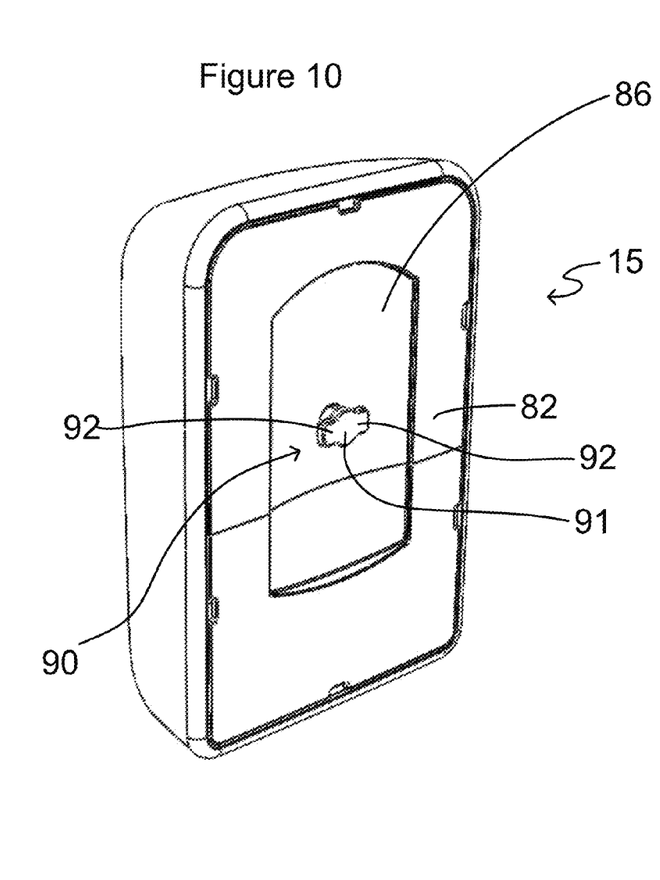
FIG. 10 shows the rangefinder module of the instrument or apparatus of FIG. 9.
Figure 11:
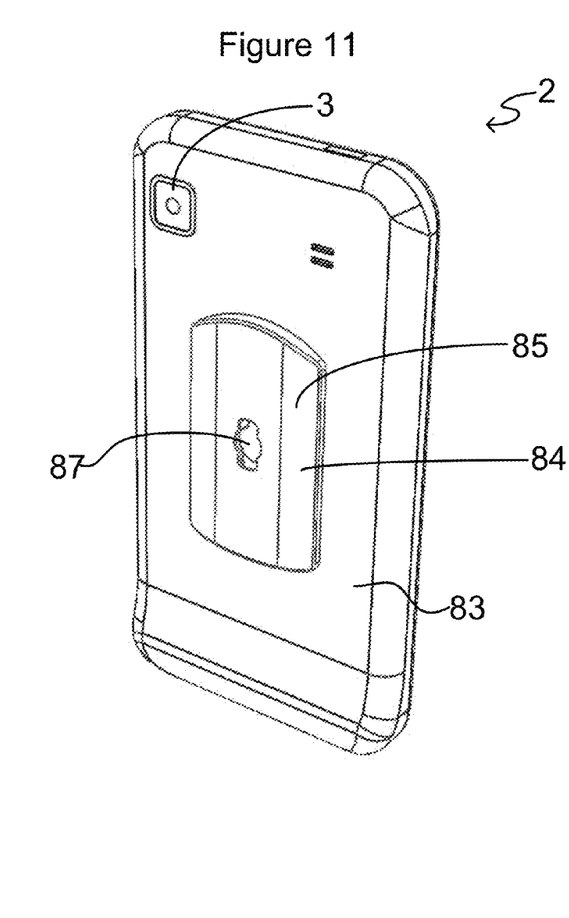
FIG. 11 shows the portable device of the instrument or apparatus of FIG. 9.

FIG. 10 shows the rangefinder module 15 and FIG. 11 shows the portable device 2. The back face 82 of the rangefinder module 15 will sit against the back face 83 of the portable device 2 in the assembled apparatus or instrument 1. As shown in FIG. 11, a mounting bracket 84 may be attached to the portable device 2. The mounting bracket 84 may be attached using an adhesive. Alternatively the mounting bracket may be shaped to fit with a particular feature of the portable device. For example, in one embodiment the mounting bracket may be shaped such that it can be attached to the portable device in place of a battery compartment cover. The mounting bracket may be shaped to cooperate with any suitable physical element of a particular portable device.

The mounting bracket 84 may include a plate 85. The rangefinder module includes a recess 86 with a shape that cooperates with the plate 85 to align the rangefinder module 15 in a desired position on the portable device 2. More generally, any arrangement of cooperating protrusions and recesses may be used to align the rangefinder module 15 in a desired position on the portable device 2.

In a preferred embodiment the cooperating protrusions and recesses align the rangefinder module and portable device in a sufficiently accurate manner that, following alignment procedures such as those described above, the rangefinder module can be removed from the portable device and reattached with no realignment process necessary.

The mounting bracket 84 may also include a locking formation 87, which may be a shaped recess. In the embodiment of FIG. 11 the locking formation 87 is a shaped recess with a central aperture and a pair of lobes extending from the central aperture. This shape cooperates with a locking mechanism 90 on the rangefinder module 15. The locking mechanism 90 includes a central shaft 91 with a pair of lugs 92 extending from the shaft 91. The locking mechanism can be rotated between a locked position as shown in FIG. 10, where the lugs extend horizontally, and an unlocked position where the lugs extend vertically.

The locking mechanism may include a locking actuator 93 (FIG. 9) that allows a user to rotate the shaft 91 when the rangefinder module is positioned on the portable device 2. Thus a user can position the rangefinder module on the portable device with the locking mechanism in an unlocked position and then turn the locking mechanism into the locked position. In the embodiment shown the locking actuator is in the form of a slotted screw-like arrangement that can be turned using a small coin or the like. However, various arrangements may be used including any suitable small latch, lever, knob or the like.

Figure 12:
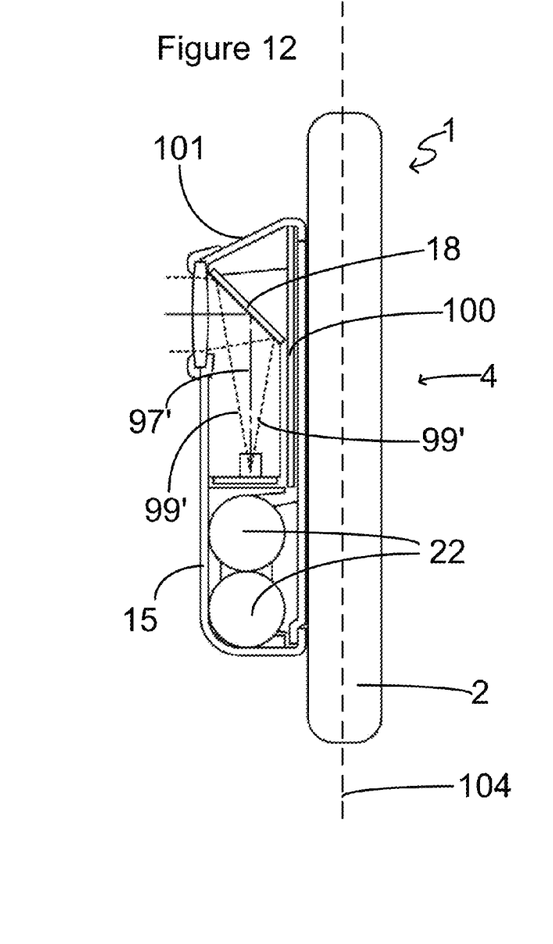
FIG. 12 is a side view of the instrument or apparatus of FIG. 9, showing the layout of some internal components of the rangefinder module.
Figure 13:
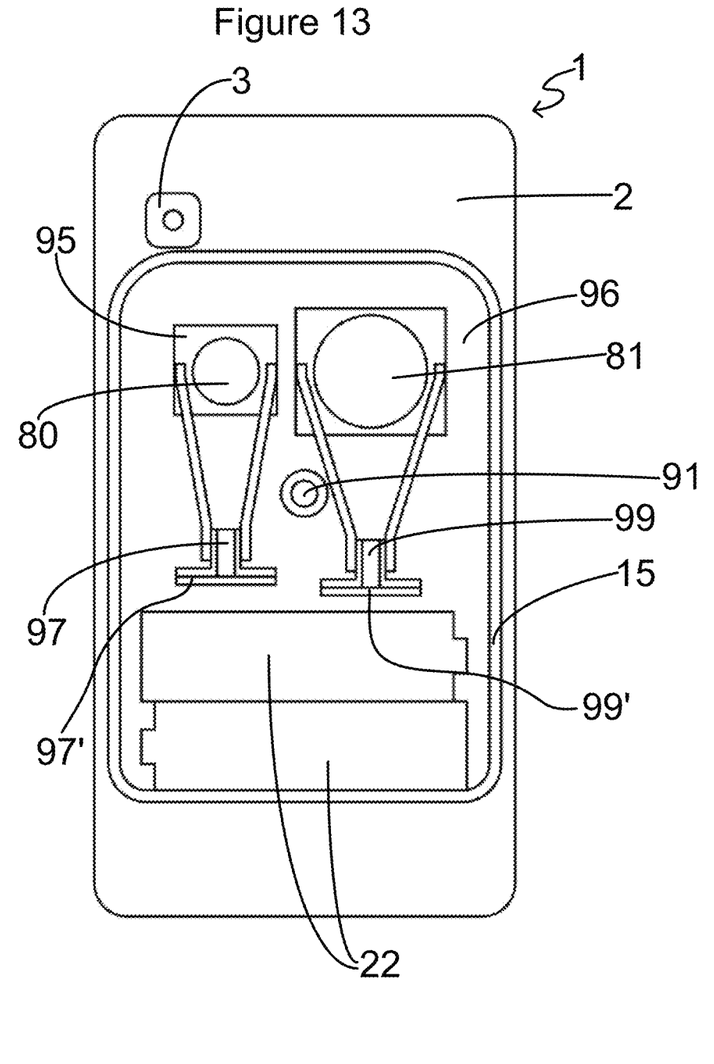
FIG. 13 is a back view of the instrument or apparatus of FIG. 9, showing the layout of some internal components of the rangefinder module.

As shown in FIGS. 12 and 13, the rangefinder module 15 includes batteries 22, which may be standard AAA or AA batteries. The rangefinder module includes a reflector arrangement 18, which is formed by two reflectors 95, 96. The rangefinder module includes a laser emitter 97 which projects a laser beam towards the first reflector 95 where the beam is redirected to exit the rangefinder module via the first window 80.

The rangefinder module also includes a laser receiver 99, which measures laser light that is reflected or scattered from a target, received through the second window 81 and redirected by reflector 96 towards the laser receiver 99.

The use of two reflectors 95, 95, one for each of the transmitter and receiver, helps to provide optical isolation of the receiver and transmitter, i.e. to limit the detection of stray signals transmitted to the receiver by an incorrect optical path.

FIG. 12 shows in dashed line the optical path 97' for the laser emitter 97. It also shows the optical path 99' for the laser receiver 99 (marked by two lines 99' indicating its width). The laser paths are redirected by the reflector arrangement 18 to be substantially aligned with the optical axis of the camera 3, with more accurate alignment achieved by the mechanisms discussed above.

The laser emitter 97 and laser receiver 99 may be mounted on laser emitter printed circuit board 97' and laser receiver printed circuit board 99' respectively (FIG. 13).

The rangefinder module 15 may also include a main printed circuit board 100 (FIG. 12) which is configured with one or more processors, memory etc as required to control operation of the rangefinder module.

The Applicant's rangefinder module preferably positions the reflectors 95, 96 close to the camera optical axis, in order to align the apparent rangefinder source with the camera optical axis as far as possible, but does not intrude significantly into the camera field of view. This is possible due to the low profile, generally flat shape of the rangefinder module. A module of a different shape could intrude into the camera field of view, or intrude to a greater extent.

As can be seen most clearly in FIG. 12, a top surface 101 of the rangefinder module may be angled away from the optical axis of the camera, to limit its intrusion into the camera field of view. In the embodiment of FIGS. 9 to 13, the portable device is generally flat-bodied (as are most current Smartphones). A flat-bodied device lies substantially in a plane (indicated by dashed line 104 in FIG. 12). In the device shown in FIG. 12 the laser rangefinder may be positioned within the laser rangefinder module such that the laser beam, before being redirected, is emitted in a plane that is substantially parallel to the plane 104 of the generally flat-bodied portable device.

In the embodiment of FIGS. 9 to 13 the rangefinder module 15 simply includes the components required for laser rangefinding. The portable device 2 in this embodiment includes a GPS and orientation sensors. However, in modifications of this embodiment the rangefinder module 15 may include further sensors, such as GPS and orientation sensors. In general any arrangement discussed above may used in a modification of this embodiment.

The laser emitter may be a commercially available photodiode laser mounted to a suitable printed circuit board (PCB). The laser receiver may be a commercially available avalanche photodiode (APD) receiver, mounted to a suitable PCB.

Figure 14:
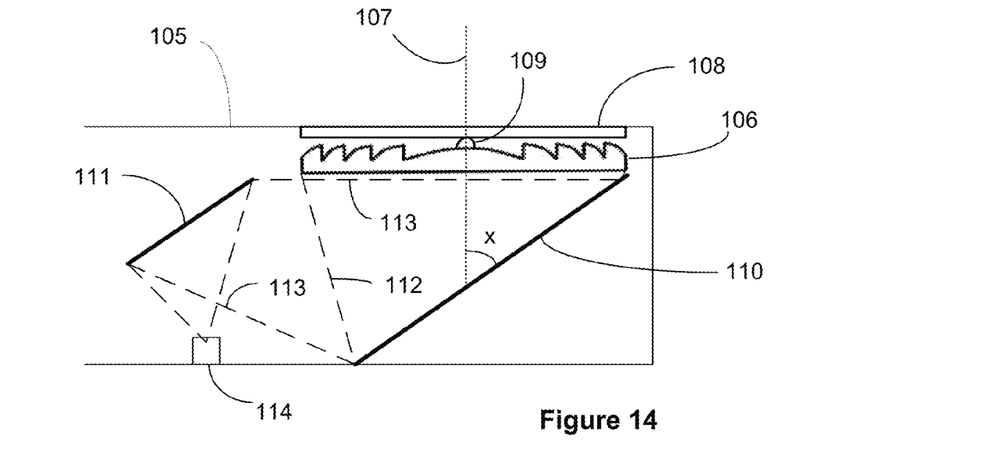
FIG. 14 shows a compact optical receiving arrangement employing a Fresnel lens and a folded optical path.
Figure 15:
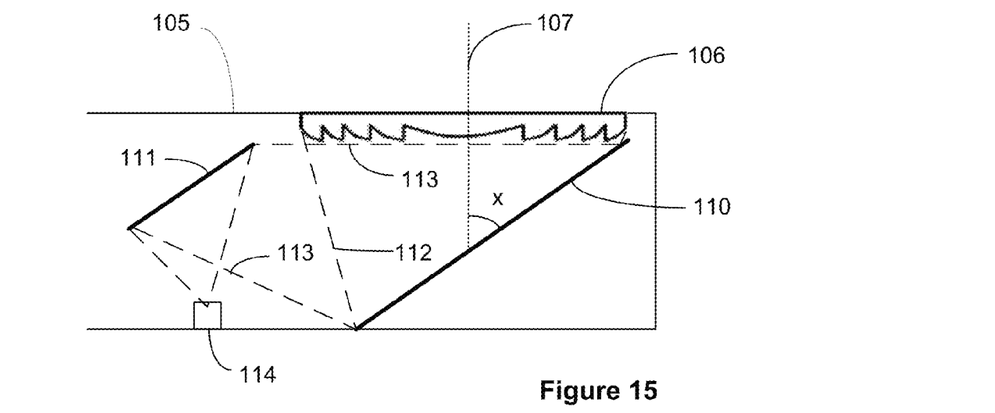
FIG. 15 shows a variant of the compact optical receiving arrangement shown in FIG. 14.
Figure 16:
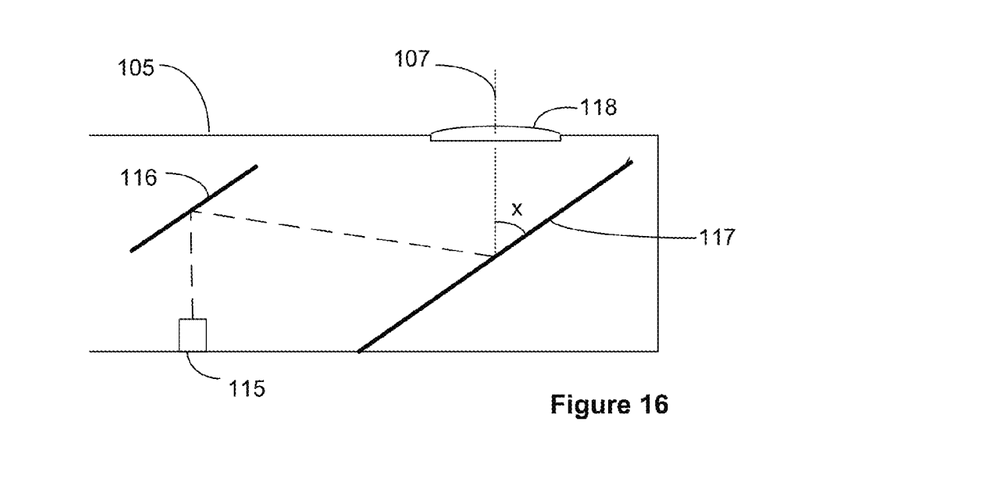
FIG. 16 shows a compact optical transmitting arrangement employing a folded optical path.

Referring now to FIGS. 14 to 16 compact optical arrangement utilizing folded optical paths on the transmit and receive paths of the laser rangefinder are shown. It is desirable to increase the size of the lens employed in the receive path to capture more light. However as the lens size is increased the thickness of a standard convex lens becomes significant, as does the depth of the rangefinder housing required to accommodate a 45 degree mirror and the total volume occupied by the optical paths.

FIG. 14 shows a first arrangement of optical elements in a receive path which addresses these issues. Within a laser rangefinder housing 105 is provided a Fresnel lens 106 centered on the rangefinder optical axis 107 (to be aligned with a camera optical axis of a portable device). A Fresnel lens is thinner than an equivalent convex lens and is appropriate as we are interested in the power of the incident light rather than producing an optical image. As the Fresnel lens is thinner this allows the reflected light paths to pass closer to the lens. The grooves of the Fresnel lens preferably face outwardly for best optical performance. As this would expose the profiled face of Fresnel lens 106 to damage a cover window 108 is preferably provided over Fresnel lens 106 (although this could be omitted if the application or physical arrangement did not require it). If a cover window 108 were provided directly on Fresnel lens 106 Newton's rings may adversely affect performance. To avoid this a nipple 109 is provided to space cover window 108 from Fresnel lens 106.

The next design feature to produce a compact design is to angle the first mirror 110 at an angle of between 50 to 60 degrees (indicated by "x") to the rangefinder optical axis 107. As the depth of housing 105 is related to sine x the greater the angle the thinner the housing may be. However, the optical path from the first mirror 113 must both clear Fresnel lens 106 and be directed to a second mirror out of the optical path 112 between the Fresnel lens 106 and first mirror 110. Whilst the geometry will depend upon the size of the lens employed and other factors a range between 50 degrees and 60 degrees has been found advantageous for a wide range of designs.

The second mirror 111 is preferably parallel to the first mirror so as to direct the received light normal to a surface mounted laser receiver 114. The orientation of the first mirror may be adjustable with respect to the rangefinder housing 105 so as to orient and/or focus the received light onto laser receiver 114. The orientation of the second mirror 111 may also be adjustable with respect to the rangefinder module, although it or the first mirror 110 may also be fixed.

Optical coatings may be provided on optical elements to filter out unwanted wavelengths. Whilst a coating could be provided on the outside surface of cover window 108 this is generally not preferred as it is vulnerable to abrasion. Whilst just the inward surface of cover window 108 or a single surface of Fresnel lens 106 could be coated, ideally both surfaces of Fresnel lens 106 and the inward surface of cover window 108 will be coated. The coating preferably provides a pass band of about 905 nm, being the frequency of the laser emitter.

FIG. 15 shows an alternate design in which like elements have been given like numbers to those used in FIG. 14. In this case the Fresnel lens 106 has been inverted so that the grooves face inwards. Although this is not the best optical orientation of Fresnel lens 106 this arrangement does away with the need for cover window 108 and nipple 109 and slightly reduces the thickness of the rangefinder. In this case an optical coating as above may be provided only on the grooved surface of Fresnel lens 106. The mirrors may be adjustable as above.

FIG. 16 shows an optical arrangement for the transmit side to be used with the receive side of FIG. 14 or FIG. 15. A laser diode 115 emits light via a folded optical path including mirrors 116 and 117 so that the output beam is aligned with rangefinder axis 107. As the beam emitted by laser diode 115 is tightly collimated the mirrors 116 and 117 as well as aspheric lens 118 can be of smaller size, although practically it may be convenient to replicate the folded path of the receive side (i.e. mirror 117 inclined at an angle of between 50 to 60 degrees to the rangefinder axis and mirror 116 parallel to mirror 117). As with the receive side one or both of mirrors 116 and 117 may have adjustable orientation to align the emitted beam with rangefinder axis 107.

The arrangements shown in FIGS. 14 to 16 may be included within a housing of the type shown in FIGS. 9 to 13 including a mounting arrangement configured to mount the laser rangefinder module to a portable device. These arrangements allow a larger light capture lens 106 to be employed whilst reducing the thickness of the housing and the volume occupied by the optical arrangement.

The Applicant's rangefinder module is readily mounted to a standard consumer electronics device, such as a Smartphone (e.g. iPhone, Blackberry etc) or any suitable device having a camera, including portable GPS units or the like. This results in reduced cost over a dedicated instrument because many users will already have such devices, or many users will be able to justify the cost of such a device for the other functions it provides.

However, the Applicant's rangefinder module is by no means simply an add-on to an existing device. Effective integration of the rangefinder module and portable device is achieved through an effective mounting arrangement and excellent alignment and calibration procedures. This allows the instrument to provide highly accurate data in an accessible and cost-effective manner. The instrument is capable of providing an image of a target, together with an accurate position of the target. The data can preferably be captured from a remote position (e.g. up to 1000 meters, or around 1100 yards, from the target).

The instrument including the portable device and rangefinder module is handheld and portable. It can therefore be conveniently carried and used.

Computer instructions for instructing the portable device and/or the rangefinder module to perform the above methods may be stored on any suitable computer-readable medium, including hard-drives, flash memory, optical memory devices, compact discs or any other suitable medium.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and methods, and illustrative examples shown and described. Accordingly, departures may be made from such details without departure from the spirit or scope of the Applicant's general inventive concept.

The invention claimed is:

1. A laser rangefinder module configured for attachment to a portable device, the portable device having a front surface and a camera having an optical axis transverse to the front surface, the module having a mounting surface configured to mount adjacent the front surface of the portable device and
   a laser rangefinder having a rangefinder axis transverse to the mounting surface, the laser rangefinder including:
   i. a laser receiver; and
   ii. a folded optical path including a first optical element which redirects incident light received along the rangefinder axis in a direction along the mounting surface before being received by the laser receiver.

2. A laser rangefinder module as claimed in claim 1 including a laser emitter.

3. A laser rangefinder as claimed in claim 2 wherein the one or more optical elements form a second folded optical path from the laser emitter to the range finder axis.

4. A laser rangefinder as claimed in claim 3 wherein the second folded optical path is formed by two or more mirrors.

5. A laser rangefinder as claimed in claim 4 wherein the second folded optical path includes a third mirror inclined at an angle of between 50 to 60 degrees to the rangefinder axis.

6. A laser rangefinder as claimed in claim 5 wherein the orientation of the third mirror is adjustable with respect to the rangefinder module.

7. A laser rangefinder as claimed in claim 6 wherein the second folded optical path includes a fourth mirror provided substantially parallel to the third mirror.

8. A laser rangefinder as claimed in claim 7 wherein the fourth mirror is adjustable with respect to the rangefinder module.

9. A laser rangefinder as claimed in claim 1 wherein the folded optical path is formed by two or more mirrors.

10. A laser rangefinder as claimed in claim 9 wherein a first mirror is inclined at an angle of between 50 to 60 degrees to the rangefinder axis.

11. A laser rangefinder as claimed in claim 10 wherein the orientation of the first mirror is adjustable with respect to the rangefinder module.

12. A laser rangefinder as claimed in claim 11 wherein a second mirror is provided substantially parallel to the first mirror.

13. A laser rangefinder as claimed in claim 12 wherein the second mirror is adjustable with respect to the rangefinder module.

14. A laser rangefinder as claimed in claim 12 wherein the laser receiver is surface mounted to a planar face of a circuit board.

15. A laser rangefinder as claimed in claim 9 wherein a Fresnel lens is provided in the optical path prior to the first mirror.

16. A laser rangefinder as claimed in claim 15 wherein grooves of the Fresnel lens face away from the first mirror.

17. A laser rangefinder as claimed in claim 16 including a cover window over the Fresnel lens.

18. A laser rangefinder as claimed in claim 17 wherein the Fresnel lens includes a nipple to keep the cover window spaced apart from the Fresnel lens.

19. A laser rangefinder as claimed in 17 wherein an optical coating is provided on the inward facing side of the cover window.

20. A laser rangefinder as claimed in claim 19 wherein the optical coating has a pass band of about 905 nm.

21. A laser rangefinder as claimed in claim 15 wherein an optical coating is provided on the Fresnel lens.

22. A laser rangefinder as claimed in claim 21 wherein the optical coating has a pass band of about 905 nm.

23. A laser rangefinder module as claimed in claim 1 including a mounting arrangement configured to mount the laser rangefinder module to a portable device.

24. A laser rangefinder module as claimed in claim 1 wherein the first optical element is a mirror which redirects incident light received directly to the laser receiver.

25. A laser rangefinder module as claimed in claim 24 wherein the first optical element redirects incident light received along the rangefinder axis in a direction parallel to the mounting surface.

26. A laser rangefinder as claimed in claim 25 including a lens prior to the mirror and wherein the path length from the lens to the first mirror is less than the path length from the mirror to the laser receiver.

27. A laser rangefinder module configured for attachment to a portable device, the portable device having a front surface and a camera having an optical axis transverse to the front surface, the module having a mounting surface configured to mount adjacent the front surface of the portable device and a laser rangefinder having a rangefinder axis transverse to the mounting surface, the laser rangefinder including:
   a. a laser receiver;
   b. a first optical element which redirects incident light received along the rangefinder axis in a direction along the mounting surface; and
   c. a second optical element which redirects light from the first optical element to the laser receiver.

28. A laser rangefinder as claimed in claim 27 including a lens prior to the first optical element and wherein the path length from the lens to the first optical element is less than the path length from the mirror to the laser receiver.

* * * * *